3,039,863
ARYL SULFONYL ACETAMIDES AS HERBICIDES

Llewellyn W. Fancher, Lafayette, and Don R. Baker, Berkeley, Calif., assignors to Stauffer Chemical Company, a corporation of Delaware
No Drawing. Filed Nov. 19, 1959, Ser. No. 854,027
2 Claims. (Cl. 71—2.6)

This invention relates to aryl sulfonyl acetamides having a single alkyl substituent on the nitrogen atom. More particularly the invention relates to compounds of the following formula:

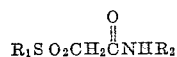

wherein $R_1$ is a phenyl radical, a halogen substituted phenyl radical or an alkyl substituted phenyl radical while $R_2$ is a lower alkyl radical either branched or straight chain.

The compounds of the present invention can be made by the reaction of a nitrogen substituted chloroacetamide with an aromatic sulfinic acid salt such as the sodium salt or can be made by the reaction of an aryl sulfonyl acetic acid ester with a primary aliphatic amine. The following working examples show various methods in which the compounds of the present invention can be made.

(1) R-2377

N-Isobutyl-p-Chlorophenyl Sulfonyl Acetamide

A mixture of 101.4 grams (0.68 M) of N-isobutyl chloro acetamide, 135.0 grams (0.68 M) of sodium-p-chlorobenzene sulfinate and 150 cubic centimeters of acetone was stirred and refluxed for six hours. The acetone was evaporated on the steam-bath to a low volume and the residue poured with stirring into 300 cubic centimeters of cold water. The solid which separated was filtered off and washed several times with cold water. The crude product thus obtained was slurried in hot water, cooled and refiltered. After drying in vacuo there was obtained 45.0 grams (21% of theory) of N-isobutyl-p-chlorophenyl sulfonyl acetamide. M.P. 123.5°–125° C.

|            | Percent Cl | Percent N |
|------------|------------|-----------|
| estimated  | 12.25      | 4.83      |
| found      | 11.70      | 4.55      |

(2) R-2489

N-Ethyl-p-Chlorophenyl Sulfonyl Acetamide

To 26.3 grams (0.1 M) of ethyl-p-chlorophenyl sulfonyl acetate was added all at once, 13.0 grams (0.2 M) of 70% ethylamine. The mixture was placed on the steam-bath and refluxed for one hour. The warm reaction mixture was poured with rapid stirring into 100 cubic centimeters of cold water and the precipitated solid filtered off and washed several times with cold water. After drying in air the crude product was crystallized from benzene yielding 18.5 grams (70% of theory) of N-ethyl-p-chlorophenyl sulfonyl acetamide. M.P. 149°–150.5° C.

|            | Percent Cl | Percent N |
|------------|------------|-----------|
| estimated  | 13.59      | 5.35      |
| found      | 13.54      | 5.19      |

(3) R-2491

N-Methyl-p-Chlorophenyl Sulfonyl Acetamide

To 26.3 grams (0.1 M) of ethyl-p-chlorophenyl sulfonyl acetate was added at one time, 18.0 grams (0.2 M) of 35% methylamine. The mixture was refluxed on the steam-bath for 2.5 hours then poured into 50 cubic centimeters of cold water. The solid was filtered off, washed several times with cold water and air dried. The crude product was crystallized from ethanol-benzene yielding 10.0 grams (40% of theory) of N-methyl-p-chlorophenyl sulfonyl acetamide. M.P. 146°–147.5° C.

|            | Percent Cl | Percent N |
|------------|------------|-----------|
| estimated  | 14.35      | 5.65      |
| found      | 14.46      | 5.75      |

By analogous procedures the following additional aryl sulfonyl acetamides were prepared:

| Code R No. | $R_1$ | $R_2$ | M.P. °C. |
|---|---|---|---|
| 2492 | p-Cl-phenyl | isopropyl | 167.5–168.5 |
| 2495 | do | n-propyl | 127–129.5 |
| 2496 | do | n-butyl | 138.5–141 |
| 2497 | do | allyl | 131–133.5 |
| 2499 | do | n-decyl | 119–120 |
| 2747 | phenyl | isopropyl | 35–37 |
| 2748 | do | n-propyl | 109–110 |
| 2771 | do | ethyl | 115–116 |
| 2772 | do | n-butyl | 110.5–112 |
| 2773 | do | isobutyl | 142–143 |
| 2782 | p-methylphenyl | n-propyl | 120–121 |
| 2783 | do | n-butyl | 100–102 |
| 2784 | do | isobutyl | 126–126.5 |
| 2795 | do | isopropyl | 128.5–131 |
| 2803 | 2,4-dimethyl-phenyl | n-propyl | 91–92.5 |

The compounds of the present invention have utility as herbicides and fungicides. Two of the compounds, namely R-2784 and R-2377 show outstanding performance as herbicides. These compounds were tested by planting seeds in three-inch pots and shortly thereafter the compound under test was applied to the pot as a drench at the rate of 5 lbs./acre. The pots were placed in a greenhouse and watered at suitable intervals and growth of the seeds was compared with similarly planted seeds to which no herbicide was added. In the case of R-2784 even at this low concentration, germination was completely inhibited of radish, mustard, cabbage, kale and collards while at the same rate, R-2377 completely inhibited the germination of seeds of Brussels sprouts, cauliflower, mustard, radish and broccoli.

Using agar plates, tests were made, using standard spore techniques on the inhibitory effect of some of the compounds on bean rust. Used at concentrations of 1000 parts/million, the following compounds almost completely inhibited the growth of the bean rust organism:

R-2489
R-2491
R-2492
R-2495
R-2496
R-2497
R-2499

We claim:
1. The method of controlling weeds comprising applying to the soil a phytotoxic amount of N-isobutyl-p-chlorophenyl sulfonyl acetamide.
2. The method of controlling weeds comprising applying to the soil a phytotoxic amount of N-isobutyl-p-methylphenyl sulfonyl acetamide.

References Cited in the file of this patent
UNITED STATES PATENTS 2,268,274 Zerweck et al. ........... Dec. 30, 1941
2,456,991 Prill ................... Dec. 21, 1948

OTHER REFERENCES

Troger et al.: Journal für Praktische Chemie, vol. 186, pages 2–10 (1908).